(12) United States Patent
Kim et al.

(10) Patent No.: US 8,512,915 B2
(45) Date of Patent: Aug. 20, 2013

(54) CATALYST COMPOSITE MATERIAL FUEL CELL, METHOD FOR PREPARING THE SAME, MEMBRANE-ELECTRODE ASSEMBLY COMPRISING THE SAME, AND FUEL CELL SYSTEM COMPRISING THE SAME

(75) Inventors: Hee-Tak Kim, Suwon-si (KR); Chan Kwak, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1653 days.

(21) Appl. No.: 11/391,754

(22) Filed: Mar. 28, 2006

(65) Prior Publication Data
US 2006/0275648 A1 Dec. 7, 2006

(30) Foreign Application Priority Data
Mar. 28, 2005 (KR) .................. 10-2005-0025433

(51) Int. Cl.
*H01M 4/02* (2006.01)
*H01M 4/36* (2006.01)

(52) U.S. Cl.
USPC ............ 429/528; 429/523; 429/527; 429/524

(58) Field of Classification Search
USPC ............................................ 429/42, 423–428
See application file for complete search history.

(56) References Cited

U.S. PATENT DOCUMENTS

| | | | | |
|---|---|---|---|---|
| 3,198,666 | A | * | 8/1965 | Gruneberg et al. ............ 429/13 |
| 3,228,797 | A | * | 1/1966 | Brown et al. ................... 429/13 |
| 3,298,969 | A | * | 1/1967 | D'Alelio ......................... 521/32 |
| 4,266,027 | A | * | 5/1981 | Muller et al. ................... 435/99 |
| 4,732,887 | A | * | 3/1988 | Obanawa et al. ............ 502/402 |
| 6,492,295 | B2 | * | 12/2002 | Hitomi et al. ................ 502/159 |
| 2003/0044672 | A1 | * | 3/2003 | Fukumoto et al. ............. 429/40 |
| 2004/0028992 | A1 | * | 2/2004 | Jaouen ............................ 429/42 |
| 2005/0255370 | A1 | | 11/2005 | Figueroa et al. |

FOREIGN PATENT DOCUMENTS

| | | |
|---|---|---|
| JP | 2004-185863 | 7/2004 |
| JP | 2004-185901 | 7/2004 |
| JP | 2005-71851 | 3/2005 |
| KR | 10-2005-0018944 | 2/2005 |

OTHER PUBLICATIONS

Patent Abstracts of Japan, Publication No. 2004-185863; Date of Publication: Jul. 2, 2004; in the name of Yasuo Miyake et al.
Patent Abstracts of Japan, Publication No. 2004-185901; Date of Publication: Jul. 2, 2004; in the name of Yoshihiro Ikoma.
Patent Abstracts of Japan, Publication No. 2005-071851; Date of Publication: Mar. 17, 2005; in the name of Hideo Kasahara et al.

* cited by examiner

*Primary Examiner* — Karie O'Neill Apicella
(74) *Attorney, Agent, or Firm* — Christie, Parker & Hale, LLP

(57) ABSTRACT

The present invention relates to a catalyst composite material which includes a catalyst characterized by oxygen-reducing activity and which is selected from the group consisting of metals, metal oxides, and combinations thereof, and a resin layer which covers at least a portion of the surface of the catalyst and comprises an anion exchange resin layer and a cation exchange resin layer.

32 Claims, 5 Drawing Sheets

CATALYST COMPOSITE MATERIAL FUEL CELL, METHOD FOR PREPARING THE SAME, MEMBRANE-ELECTRODE ASSEMBLY COMPRISING THE SAME, AND FUEL CELL SYSTEM COMPRISING THE SAME

CROSS-REFERENCE TO RELATED APPLICATION

This application claims priority to and the benefit of Korean Patent Application No. 10-2005-0025433 filed in the Korean Intellectual Property Office on Mar. 28, 2005, the entire content of which is incorporated herein by reference.

FIELD OF THE INVENTION

The present invention relates to a catalyst composite material for a fuel cell, a method of preparing the same, and a membrane-electrode assembly and a fuel cell system comprising the same. More particularly, the present invention relates to a catalyst composite material having oxygen-reducing activity, a method of preparing the same, and a membrane-electrode assembly and a fuel cell system comprising the same.

BACKGROUND OF THE INVENTION

A fuel cell is a power generation system for producing electrical energy through the electrochemical redox reaction of an oxidant and a fuel such as hydrogen or a hydrocarbon-based material such as methanol, ethanol, natural gas, or the like.

The fuel cell can be classified as a phosphoric acid type, molten carbonate type, solid oxide type, polymer electrolyte type, or an alkaline type depending upon the kind of electrolyte used. Although each fuel cell basically operates in accordance with the same principles, the kind of fuel, the operating temperature, the catalyst, and the electrolyte may be selected depending upon the type of cell.

Recently, a polymer electrolyte membrane fuel cell (PEMFC) has been developed in which the power characteristics are superior to that of conventional fuel cells, the operating temperature has been lowered, and the starting and response characteristics are faster. It has advantages in that it can be applied to a wide variety of fields such as transportable electrical power sources for automobiles, distributed power such as for a house and a public building, and a small electrical power source for an electronic device.

The basic system of the PEMFC is essentially composed of an electricity generating element (a stack), a reformer, and a fuel supplier. The electricity generating element forms the body of the fuel cell, and the fuel supplier provides fuel to the reformer. The reformer reforms the fuel to generate hydrogen gas and supplies hydrogen gas to the stack. The electricity generating element generates electrical energy through the electrochemical reaction of the supplied hydrogen gas and oxygen.

On the other hand, the fuel cell may be a direct oxidation fuel cell (DOFC) in which liquid fuel is directly introduced to the electricity generating element. Such direct oxidation fuel cells include direct methanol fuel cells and do not have the reformer.

According to the fuel cell system described above, the stack actually generating the electricity has a structure in which a plurality of unit cells consisting of a membrane-electrode assembly (MEA) and a separator (also referred to as "bipolar plate") are stacked. The membrane-electrode assembly is composed of an anode (referred to as "fuel electrode" or "oxidation electrode") and a cathode (referred to as "air electrode" or "reduction electrode") interposed by the polymer electrolyte membrane. The separator simultaneously acts as a path for supplying fuel required for the reaction to the anode and oxidant to the cathode, as well as a conductor for connecting the cathode of the membrane-electrode assembly to the anode of the neighboring membrane-electrode assembly.

In this process, an electrochemical oxidation of the fuel occurs on the anode, and an electrochemical reduction of oxygen occurs on the cathode, and as a result of the transfer of the electrons generated, electrical energy, heat, and water are obtained.

Protons generated at the anode are reacted with an oxidant supplied to the cathode on the surface of a platinum (Pt) catalyst to produce water. However, the platinum catalyst has a high cost, and therefore research has been devoted to a catalyst which can perform well using smaller quantities of expensive metals.

SUMMARY OF THE INVENTION

An embodiment of the present invention provides a catalyst composite material for reducing oxygen using hydroxide ions by coating the catalyst with a double layer comprising an anion exchange resin layer and a cation exchange resin layer.

Another embodiment of the present invention provides a method of preparing the catalyst composite material.

Yet another embodiment of the present invention provides a membrane-electrode assembly for a fuel cell that includes the catalyst composite material.

A further embodiment of the present invention provides a fuel cell system that includes the catalyst composite material.

An embodiment of the present invention provides a catalyst composite material for a fuel cell that includes a catalyst having oxygen-reducing activity and a resin layer. The catalyst includes a component selected from the group consisting of a metal, a metal oxide, and combinations thereof. The resin layer is formed on the partial or entire surface of the catalyst, and includes an anion exchange resin layer and a cation exchange resin layer.

Another embodiment of the present invention provides a membrane-electrode assembly for a fuel cell that includes a polymer electrolyte membrane, an anode adjacent to one side of the polymer electrolyte membrane, and a cathode adjacent to the other side of the polymer electrolyte membrane. The cathode includes the above catalyst composite material.

Another embodiment of the present invention provides a fuel cell system that includes an electricity generating element, a fuel supplier, and an oxidant supplier. The electricity generating element includes a membrane-electrode assembly, and separators to be positioned at both sides of the membrane-electrode assembly. The membrane-electrode assembly includes a polymer electrolyte membrane, and an anode adjacent to one side of the polymer electrolyte membrane and a cathode adjacent to the other side of the polymer electrolyte membrane. The cathode includes the above catalyst composite material.

BRIEF DESCRIPTION OF THE DRAWINGS

The present invention will become more fully understood from the detailed description given below and the accompanying drawings which are given by way of illustration only, and thus do not limit the present invention.

DETAILED DESCRIPTION OF THE INVENTION

Catalyst composite materials of the present invention include catalysts characterized by oxygen-reducing activity selected from the group consisting of metals, metal oxides, and combinations thereof, and anion and cation exchange resin layers covering at least a portion of or the entire surface of the catalyst.

Figure 1:
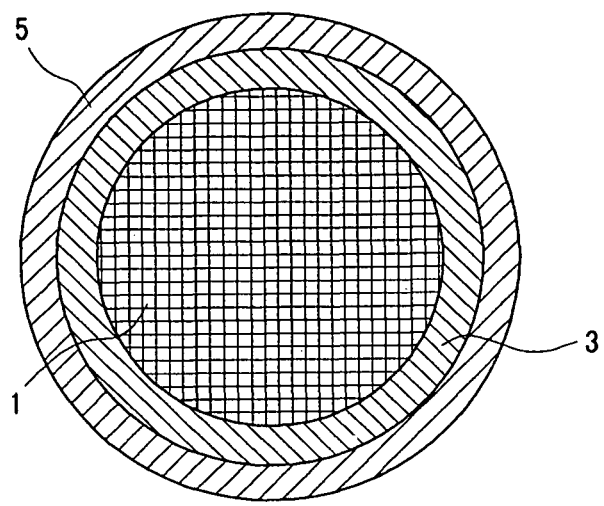
FIG. 1 is a cross-sectional view showing catalyst composite material for a fuel cell according to one embodiment of the present invention.

FIG. 1 is a cross-sectional view of catalyst composite material for fuel cells according to an embodiment of the present invention. However, the structure of the catalyst composite material for fuel cells is not limited thereto.

As shown in FIG. 1, catalyst composite materials for fuel cells of the present invention include catalysts 1 with components selected from the group consisting of metals, metal oxides, and combinations thereof, anion exchange resin layers 3 covering the partial or entire surface of the catalyst 1, and cation exchange resin layers 5 covering the partial or entire surface of the anion exchange resin layers 3. The catalyst promotes the reduction reaction of oxygen by generating hydroxide ions on its surface from oxygen and water. The reduction reaction scheme of the oxygen is as follows.

Reaction Scheme 1

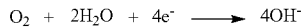

$$O_2 + 2H_2O + 4e^- \longrightarrow 4OH^-$$

The catalyst can preferably include metals selected from the group consisting of Na, K, Ca, Ag, Cu, Ni, Co, Mo, Ru, Re, Rb, Pb, Pt, and La.

Also, the catalyst can include metal oxides preferably selected from the group consisting of $M_aO_b$, $M_pN_qO_r$ and $M_xN_yP_wO_z$ (where, M, N, and P are respectively selected from the group consisting of Na, K, Ca, Ag, Cu, Ni, Co, Mo, Ru, Re, Rb, Pb, Pt, and La, and a, b, p, q, r, x, and y are in the following ranges: $0.1 \leq a \leq 3$, $0.1 \leq b \leq 8$, $0.1 \leq p \leq 3$, $0.1 \leq q \leq 3$, $0.1 \leq r \leq 12$, $0.1 \leq x \leq 3$, and $0.1 \leq y \leq 3$, $0.1 \leq w \leq 3$, $0.1 \leq z \leq 20$), and more preferably selected from the group consisting of $MnO_2$, $Co_3O_4$, $NiCo_2O_4$, $Rb_2Ru_2Pb_{1-m}O_{1-n}$ (where $0 \leq m \leq 1$, $0 \leq n \leq 0.2$), $Pb_2Ru_2O_{6.5}$, $Na_{0.8}Pt_3O_4$, and $La_{0.6}Ca_{0.4}CoO_3$.

In an embodiment of the invention, the catalysts selected from the group consisting of the above metals, metal oxides, and combinations thereof are supported on an electro-conductive supporter. For the electro-conductive supporter, any conductive material can be used, but it is preferably selected from the group consisting of carbon and conductive polymers.

In a further embodiment of the invention, the electro-conductive supporter may have a hydrophobic surface.

Figure 2:
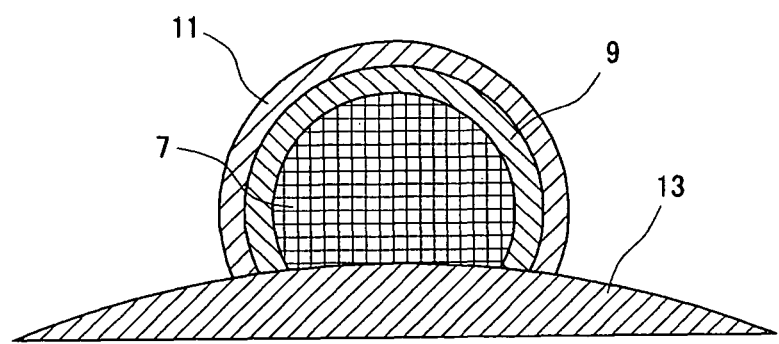
FIG. 2 is a cross-sectional view showing catalyst composite material for a fuel cell according to another embodiment of the present invention.

FIG. 2 is a cross-sectional view showing catalyst composite material for a fuel cell according to another embodiment of the present invention. As shown in FIG. 2, catalyst composite material for a fuel cell includes a catalyst 7 with components selected from the group consisting of the aforementioned metals, metal oxides, and combinations thereof and supported on an electro-conductive supporter 13, an anion exchange resin layer 9 covering the partial or entire surface of the catalyst 7, and a cation exchange resin layer 11 covering the partial or entire surface of the anion exchange resin layer 9.

In an embodiment of the present invention, the anion exchange resin layer covering the catalyst includes a polymer resin capable of conveying hydroxide ions ($OH^-$), preferably an anion exchange resin having an amine-based functional group which is covalently bonded to a terminal end of a polymer side chain, and more preferably an anion exchange resin having amine-based functional groups which are covalently bonded to the terminal end of a polymer side chain, where the functional groups are selected from the group consisting of —$NH_2$, —$NR_2$, —$NHR$, —$NR_3^+OH^-$, —$NHR_2^+$ $OH^-$, —$NH_2R^+OH^-$, and —$NH_3^+OH^-$ (where R is respectively selected from the group consisting of $C_kH_{2k+1}$, $C_kF_{2k+1}$, and $C_kCl_{2k+1}$, and k is an integer in the range of 1 to 5) and combinations thereof.

In another embodiment of the present invention, the backbone of the polymer chain included in the anion exchange resin layer is a polymer selected from the group consisting of polyolefin, a perfluoro-based polymer, polyetheretherketone, polysulfone, and polyetherimide, and combinations thereof.

In addition, the cation exchange resin layer may include common cation exchange resins for fuel cells. In an embodiment of the present invention, the cation exchange resin is covalently bonded with a functional group selected from the group consisting of sulfonic acid groups, carboxylic acid groups, and phosphoric acid groups, and combinations thereof, at the terminal end of a polymer side chain.

In another embodiment of the invention, the cation exchange resin layer may include a cation exchange resin having excellent cation conductivity and selected from the group consisting of perfluoro-based polymers, benzimidazol-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, and polyphenylquinoxaline-based polymers. According to a futher embodiment, the cation exchange resin is selected from the group consisting of poly (perfluorosulfonic acid), poly(perfluorocarboxylic acid), copolymers of fluorovinyl ether and tetrafluoroethylene having sulfonic acid groups, defluorinated polyether ketone sulfide, aryl ketone, poly(2,2'-(m-phenylene)-5,5'-bibenzimidazole), and poly(2,5-benzimidazole), and combinations thereof. However, the cation exchange resin is not limited thereto.

FIGS. 1 and 2 illustrate catalyst composite material, wherein a catalyst 1, 7 is covered with an anion exchange resin layer 3, 9 and then a cation exchange resin layer 5, 11 is covered thereon. However, the catalyst composite material can be formed with the two resin layers deposited in the opposite order.

In an embodiment of the invention, the anion exchange resin layer has an average thickness of 0.1 to 100 nm, and more preferably 1 to 10 nm. An anion exchange resin with a thickness of less than 0.1 nm can slow down the transport speed of anions, while a thickness of more than 100 nm can deteriorate the oxygen supply effect.

In another embodiment, the cation exchange resin layer has an average thickness of 0.1 to 100 nm, and more preferably 1 to 10 nm. A cation exchange resin with a thickness of less than 0.1 nm can impede the transfer of cations, while a thickness of more than 100 nm may deteriorate the oxygen supply effect.

Figure 3:
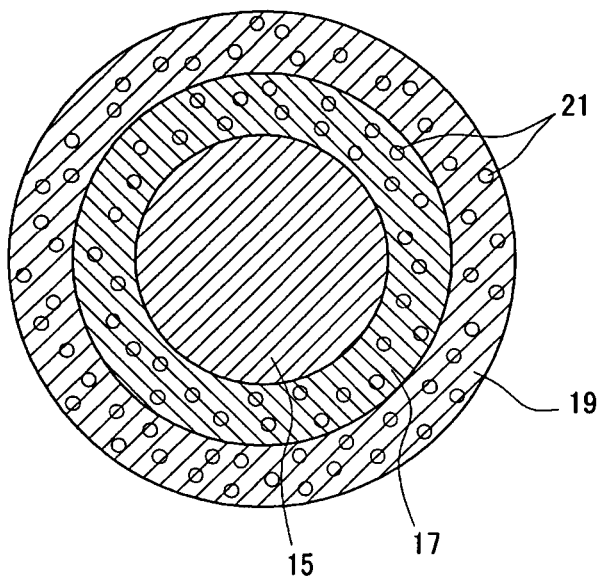
FIG. 3 is a cross-sectional view showing catalyst composite material for a fuel cell according to another embodiment of the present invention.

In a further embodiment, as shown in FIG. 3, anion and cation exchange resin layers 17 and 19 formed on the surface of a catalyst 15 are formed as porous layers with pores 21. The porous layers preferably have a porosity of 40 to 90%.

The exchange resin layers may be formed somewhat thicker when they are porous.

In an embodiment of the present invention, the porous anion exchange resin layer is formed with a thickness of 0.1 to 500 nm, and preferably 1 to 20 nm. A thickness less than 0.1 nm of the anion exchange resin can slow down its transport speed and make it more likely cations would pass through the anion exchange resin layer, while a thickness of over 500 nm may deteriorate the oxygen supply effect.

Furthermore, in an additional embodiment the porous cation exchange resin layer is formed with a thickness of 0.1 to 500 nm, and preferably 1 to 20 nm. Here, a thickness of the cation exchange resin of under 0.1 nm can deteriorate cation transfer, while a thickness of over 500 nm can deteriorate the oxygen supply effect.

Figure 4:
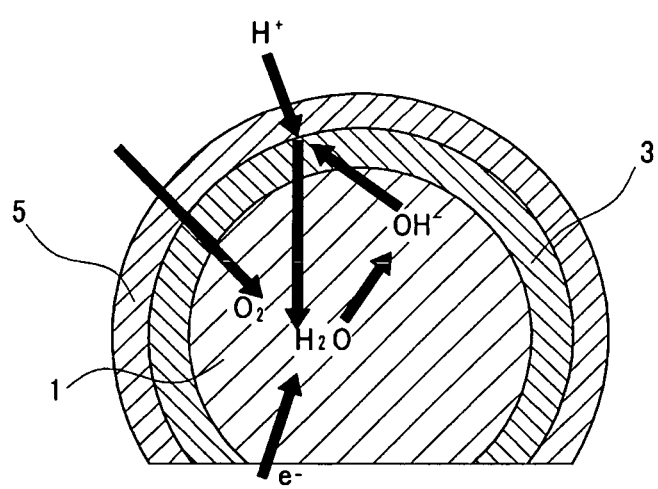
FIG. 4 is a schematic view showing an oxygen reduction reaction on a catalyst composite material for a fuel cell of the present invention.

FIG. 4 is a schematic view showing the reduction reaction of oxygen, which occurs in catalyst composite materials for fuel cells of the present invention. As shown in FIG. 4, water required for the reduction reaction of oxygen is generated at the interface between anion exchange resin layer 3 and cation exchange resin layer 5. Its specific reaction can be described as the aforementioned reaction scheme 1.

In an embodiment of the invention, the catalyst composite material for a fuel cell can be prepared through the following steps: first, coating an anion exchange resin layer on the surface of a catalyst comprising a component selected from the group consisting of the aforementioned metals, metal oxides, and combinations thereof; and next, coating a cation exchange resin layer on the anion exchange resin layer.

In another embodiment, the coating of an anion exchange resin layer has no particular limits, but a catalyst comprising a component selected from the group consisting of the metals, metal oxides, and combinations thereof is preferably mixed with a solvent, and then dried together.

The second step is preferably performed by coating a cation exchange resin solution onto the surface of the anion exchange resin layer, and then drying it. Here, the coating can be performed by spraying a cation exchange resin solution or mixing a catalyst coated with the anion exchange resin layer with a cation exchange resin solution. However, it is understood that the coating method is not limited thereto.

In a further embodiment, the catalyst composite material can be prepared by directly applying a catalyst and an anion exchange resin on an electrode substrate, and then drying it to form a catalyst layer coated with an anion exchange resin layer, and next, spray-coating a cation exchange resin thereon.

For the catalyst used for the catalyst composite material for a fuel cell, an anion exchange resin, and a cation exchange resin, the same examples as aforementioned can be used, and thus detailed descriptions thereof are omitted. As described above, the anion exchange resin layer is formed on the catalyst, and the cation exchange resin layer is formed on the anion exchange resin layer. However, the anion exchange resin layer and the cation exchange resin layer can be formed in the reverse order.

A catalyst composite material for a fuel cell of the present invention can be used in preparing the cathode of a membrane-electrode assembly for a fuel cell.

Figure 5:
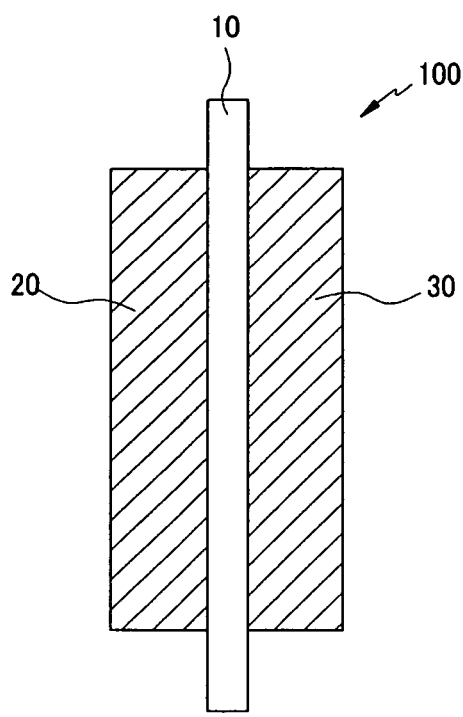
FIG. 5 is a cross-sectional view showing a membrane-electrode assembly for a fuel cell of the present invention.

FIG. 5 is a cross-sectional view of a membrane-electrode assembly according to one embodiment of the present invention. As shown in FIG. 5, the membrane-electrode assembly 100 includes a polymer electrolyte membrane 10, an anode 20 adjacent to one side of the electrolyte membrane, and a cathode 30 adjacent to the other side of the polymer electrolyte membrane. The cathode 30 includes the above catalyst composite material.

The cathode may further include conductive agents selected from the group consisting of carbon black, carbon fiber, carbon nanotubes, carbon nanospheres, carbon nanohorns, conductive polymers, and combinations thereof.

In an embodiment of the present invention, the anode includes a general catalyst, which is a metal catalyst selected from the group consisting of platinum, ruthenium, osmium, platinum-ruthenium alloys, platinum-osmium alloys, platinum-palladium alloys, and platinum-M alloys (where M is a transition element selected from the group consisting of Ga, Ti, V, Cr, Mn, Fe, Co, Ni, Cu, Zn, and combinations thereof).

The catalyst in the anode can be supported on an electro-conductive supporter. The electro-conductive supporter may be any conductive material, and in one embodiment of the invention is selected from the group consisting of carbon and conductive polymers.

The cathode and anode include a diffusion layer as an electrode supporter, as well as a catalyst layer that includes a cathode catalyst composite material and an anode catalyst, respectively. As for the diffusion layer, carbon paper, carbon cloth, or metal cloth can be used, but it is not limited thereto. A microporous layer may be formed between the diffusion layer and the catalyst layer, as needed.

The microporous layer may include carbon materials, for example graphite, fullerene (C60), activated carbon, carbon black, acetylene black, Vulcan, nano-carbon such as carbon nanotubes, carbon nanofiber, carbon nanowire, carbon nanohorns, carbon nanorings, or the like. It may also include a binder selected from the group consisting of poly(perfluorosulfonic acid), poly(tetrafluoroethylene), and fluorinated ethylene-propylene.

In an embodiment of the invention, the polymer electrolyte membrane in the membrane-electrode may include a proton conductive polymer that is conventionally used as a material for the electrolyte membrane for a fuel cell, and includes proton conductive polymers selected from the group consisting of perfluoro-based polymers, benzimidazol-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, and polyphenylquinoxaline-based polymer, and combinations thereof, and more preferably a proton conductive polymer selected from the group consisting of poly(perfluorosulfonic acid), poly(perfluorocarboxylic acid), copolymers of fluorovinyl ether and tetrafluoroethylene having sulfonic acid groups, defluorinated polyetherketone sulfide, aryl ketone, poly(2,2'-(m-phenylene)-5,5'-bibenzimidazole), and poly(2,5-benzimidazole), and combinations thereof. However, the proton conductive polymer for the polymer electrolyte membrane for the fuel cell of the present invention is not limited thereto.

Figure 6:
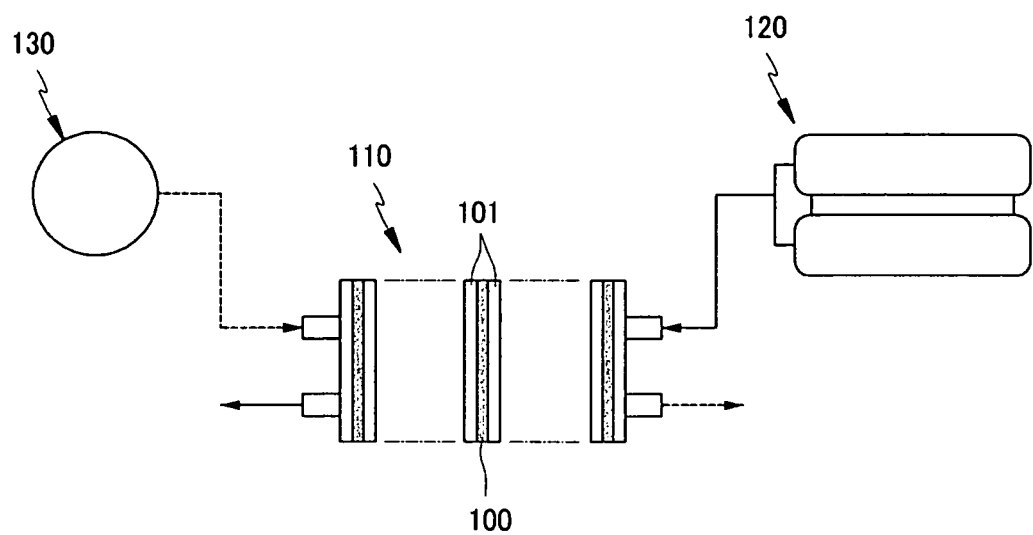
FIG. 6 is a schematic view showing a fuel cell system according to the present invention.

FIG. 6 shows the schematic structure of a fuel cell system of the present invention. Referring to FIG. 6, a fuel cell system includes an electricity generating element 110, a fuel supplier 120, and an oxidant supplier 130. The electricity generating element 110 includes a membrane-electrode assembly 100, and separators 101 to be positioned at both sides of the membrane-electrode assembly. The membrane-electrode assembly 100 includes a polymer electrolyte membrane, and an anode adjacent to one side of the polymer electrolyte membrane and a cathode adjacent to the other side of the polymer electrolyte membrane. The cathode includes the above catalyst composite material.

The fuel cell system may be a polymer electrolyte fuel cell (PEMFC) or a direct oxidation fuel cell (DOFC). The polymer electrolyte fuel cell may include a reformer to generate hydrogen gas from a hydrogen-containing fuel.

Hereinafter, examples of the present invention are described. The following examples further illustrate the present invention in detail, but are not to be construed to limit the scope thereof.

EXAMPLES

Example 1

A catalyst slurry was prepared by mixing 1 g of a polyallylamine-Cl salt, 5 g of $MnO_2$ powder, and 2 g of Super-P powder in 50 g of water.

The prepared slurry was coated on a 200 μm-thick carbon paper to form a 50 μm-thick layer, and then dried at 60° C., obtaining catalyst composite material coated with an anion exchange resin layer.

Then, a 3 wt % NAFION™ (DuPont) solution was spray-coated on the anion exchange resin layer to form a cation exchange resin layer, preparing a resultant catalyst composite material. In addition, an electrode was prepared including the catalyst composite material.

Example 2

A mixture of 7 g of 20 wt % Ag particles with an average particle diameter of 4 nm supported on carbon (Vulcan XC) as a catalyst and 1 g of a polyallylamine-Cl salt was ultrasonically dispersed in 50 g of water and then dried, forming an anion exchange resin layer on the catalyst.

Then, a slurry was prepared by mixing 7 g of the catalyst with the anion exchange resin layer with 1 g of NAFION™ (DuPont) in 50 g of isopropyl alcohol and screen-printing the mixture on a carbon paper used as an electrode substrate, thereby preparing a catalyst composite material. In this way, an electrode including the catalyst composite material was prepared.

Example 3

An electrode was prepared according to the same method as in Example 2, except that a catalyst slurry was prepared by mixing 7 g of 20 wt % Ag particles with an average particle diameter of 4 nm supported on carbon (Vulcan XC), 1 g of a polyallylamine-Cl salt, and 2 g of super-P into 50 g of water.

Comparative Example 1

A catalyst slurry was prepared by mixing 2 g of a platinum catalyst (platinum amount: 20 wt %) with 4.8 g of a poly(perfluorosulfonic acid) solution (a NAFION™ solution produced by DuPont).

The catalyst slurry was coated on a 200 μm-thick carbon paper to form a 50 μm-thick layer and dried at 60° C. to prepare an electrode.

Example 4

A membrane-electrode assembly was prepared by using an electrode prepared according to Comparative Example 1 as an anode, and an electrode prepared according to Example 1 as a cathode, and then respectively assembling them on each side of a 120 μm-thick poly(perfluorosulfonic acid) electrolyte membrane.

Example 5

Another membrane-electrode assembly was prepared according to the same method as in Example 4, except that an electrode prepared according to Example 1 was used as a cathode.

Example 6

A membrane-electrode assembly was prepared according to the same method as in Example 4, except that an electrode prepared according to Example 2 was used as a cathode.

Example 7

A membrane-electrode assembly was prepared according to the same method as in Example 5, except that an electrode prepared according to Example 3 was used as a cathode.

Comparative Example 2

A membrane-electrode assembly was prepared by using electrodes prepared according to Comparative Example 1 as an anode and a cathode, and then respectively assembling them at each side of a 120 μm-thick poly(perfluorosulfonic acid) electrolyte membrane.

Example 8

A fuel cell system was prepared by deposing separators at both sides of a membrane-electrode assembly prepared according to Example 4 and mounting a fuel supplier and an oxidant supplier as illustrated in FIG. 6.

Example 9

A fuel cell system was prepared by deposing separators at both sides of a membrane-electrode assembly prepared according to Example 5 and mounting a fuel supplier and an oxidant supplier as illustrated in FIG. 6.

Example 10

A fuel cell system was prepared by deposing separators at both sides of a membrane-electrode assembly prepared according to Example 6 and mounting a fuel supplier and an oxidant supplier as illustrated in FIG. 6.

Example 11

A fuel cell system was prepared by deposing separators at both sides of a membrane-electrode assembly prepared according to Example 7 and mounting a fuel supplier and an oxidant supplier as illustrated in FIG. 6.

Figure 7:
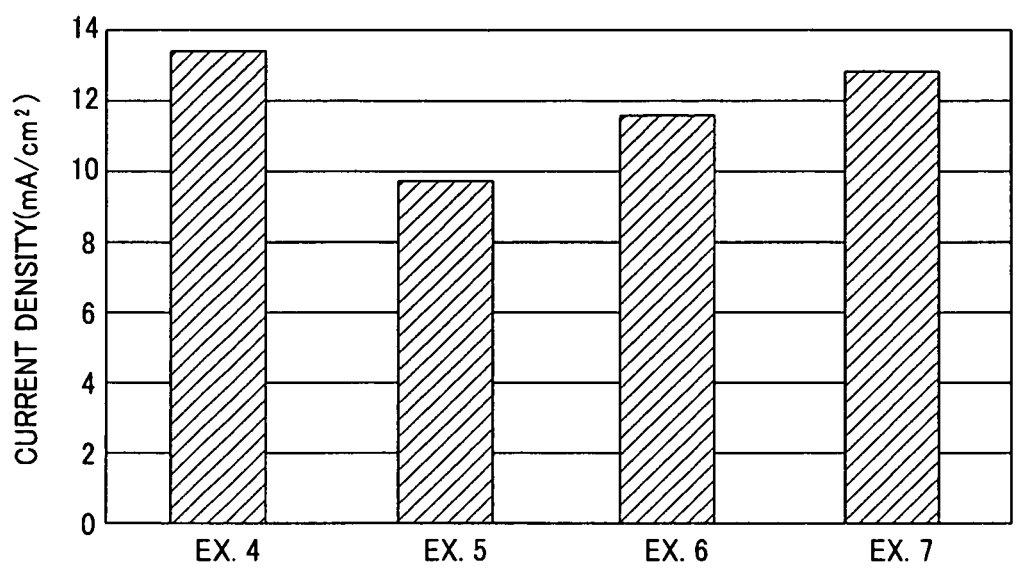
FIG. 7 is a graph showing oxygen reduction reaction speeds at cathodes of membrane-electrode assemblies according to Examples 4 to 7.

Cathodes of membrane-electrode assemblies prepared according to Examples 4 to 7 were dipped in a 0.5M sulfuric acid solution and saturated by bubbling oxygen at room temperature. Then, their oxygen reduction reaction rates were measured at a rotating speed of 400 rpm and 0.1V (vs. RHE) by using a rotating disk electrode. FIG. 7 shows the results.

As shown in FIG. 7, the catalyst composite material for a fuel cell of the present invention has an oxygen reduction reaction rate essentially equivalent to that of a conventional catalyst for a fuel cell.

Since the catalyst composite material for a fuel cell of the present invention can be manufactured at a low cost despite its equivalent effect to a conventional catalyst for a fuel cell, it has excellent characteristics such as the ability to be mass produced, and providing cost reduction in the manufacturing of a fuel cell.

While this invention has been described in connection with what are presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst composite material for a fuel cell, comprising:
   at least one catalyst particle characterized by oxygen-reducing activity, the catalyst particle consisting essentially of a material selected from the group consisting of metals, metal oxides, and combinations thereof; and
   a resin layer encasing the catalyst particle, wherein the resin layer comprises an anion exchange resin layer encasing the catalyst particle and a cation exchange resin layer encasing the anion exchange resin layer.

2. The catalyst composite material of claim 1, wherein the catalyst particle consists essentially of a metal selected from the group consisting of Na, K, Ca, Ag, Cu, Ni, Co, Mo, Ru, Re, Rb, Pb, Pt, La, and combinations thereof.

3. The catalyst composite material of claim 1, wherein the catalyst particle consists essentially of a metal oxide selected from the group consisting of $M_aO_b$, $M_pN_qO_r$, and $M_xN_yP_wO_z$ and combinations thereof, where each of M, N, and P is independently a metal selected from the group consisting of Na, K, Ca, Ag, Cu, Ni, Co, Mo, Ru, Re, Rb, Pb, Pt, and La, $0.1 \leq a \leq 3$, $0.1 \leq b \leq 8$, $0.1 \leq p \leq 3$, $0.1 \leq q \leq 3$, $0.1 \leq r \leq 12$, $0.1 \leq x \leq 3$, $0.1 \leq y \leq 3$, $0.1 \leq w \leq 3$, and $0.1 \leq z \leq 20$.

4. The catalyst composite material of claim 1, wherein the catalyst particle consists essentially of a metal oxide selected from the group consisting of $MnO_2$, $Co_3O_4$, $NiCo_2O_4$, $Rb_2Ru_2Pb_{1-m}O_{1-n}$ where $0 \leq m \leq 1$, $0 \leq n \leq 0.2$, $Pb_2Ru_2O_{6.5}$, $Na_{0.8}Pt_3O_4$, and $La_{0.6}Ca_{0.4}CoO_3$, and combinations thereof.

5. A catalyst composite material for a fuel cell, comprising:
   at least one catalyst particle characterized by oxygen-reducing activity selected from the group consisting of:
   metals selected from the group consisting of Na, K, Ca, Ag, Cu, Ni, Mo, Re, Rb, Pb, La, and combinations thereof,
   metal oxides, and
   combinations thereof,
   wherein the at least one catalyst particle is supported on an electro-conductive supporter; and
   a resin layer covering an exposed surface of the catalyst particle, wherein the resin layer comprises an anion exchange resin layer and a cation exchange resin layer, wherein at least a portion of the electro-conductive supporter is exposed, and wherein at least a portion of the cation exchange resin layer contacts the electro-conductive supporter.

6. The catalyst composite material of claim 5, wherein the electro-conductive supporter is selected from the group consisting of carbon, conductive polymers, and combinations thereof.

7. The catalyst composite material of claim 1, wherein the anion exchange resin layer comprises an amine-based functional group which is covalently bonded to the terminal end of a side chain of a polymer.

8. The catalyst composite material of claim 7, wherein the amine-based functional group is selected from the group consisting of $-NH_2$, $-NR_2$, $-NHR$, $-NR_3^+OH^-$, $-NHR_2^+OH^-$, $-NH_2R^+OH^-$, and $-NH_3^+OH^-$ and combinations thereof, where R is independently selected from the group consisting of $C_kH_{2k+1}$, $C_kF_{2k+1}$, and $C_kCl_{2k+1}$, and k is an integer ranging from 1 to 5, and combinations thereof.

9. The catalyst composite material of claim 7, wherein the polymer is selected from the group consisting of polyolefins, perfluoro-based polymers, polyetheretherketones, polysulfones, polyetherimides, and combinations thereof.

10. The catalyst composite material of claim 1, wherein the cation exchange resin layer comprises a cation exchange resin comprising a functional group covalently bonded to the terminal end of a side chain of a polymer, said functional group selected from the group consisting of sulfonic acid groups, carboxylic acid groups, phosphoric acid groups, and combinations thereof.

11. The catalyst composite material of claim 1, wherein the anion exchange resin layer has an average thickness of 0.1 nm to 100 nm.

12. The catalyst composite material of claim 1, wherein the cation exchange resin layer has an average thickness of 0.1 nm to 100 nm.

13. The catalyst composite material of claim 1, wherein the anion exchange resin layer and the cation exchange resin layer are porous.

14. A membrane-electrode assembly for a fuel cell, comprising:
    a polymer electrolyte membrane; and
    an anode adjacent to one side of the polymer electrolyte membrane and a cathode adjacent to the other side of the polymer electrolyte membrane,
    the cathode comprising a catalyst composite material comprising:
    a catalyst particle characterized by oxygen-reducing activity selected from the group consisting of:
    metals selected from the group consisting of Na, K, Ca, Ag, Cu, Ni, Mo, Re, Rb, Pb, La, and combinations thereof,
    metal oxides, and
    combinations thereof, and
    a resin layer encasing the catalyst particle and comprising an anion exchange resin layer encasing the catalyst particle and a cation exchange resin layer encasing the anion exchange resin layer.

15. The membrane-electrode assembly of claim 14, wherein the cation exchange resin layer covers at least a portion of the anion exchange resin layer.

16. The membrane-electrode assembly of claim 14, wherein the catalyst particle comprises a metal oxide selected from the group consisting of $M_aO_b$, $M_pN_qO_r$, and $M_xN_yP_wO_z$, and combinations thereof, where each of M, N, and P is independently a metal selected from the group consisting of Na, K, Ca, Ag, Cu, Ni, Co, Mo, Ru, Re, Rb, Pb, Pt, and La, $0.1 \leq a \leq 3$, $0.1 \leq b \leq 8$, $0.1 \leq p \leq 3$, $0.1 \leq q \leq 3$, $0.1 \leq r \leq 12$, $0.1 \leq x \leq 3$, $0.1 \leq y \leq 3$, $0.1 \leq w \leq 3$, and $0.1 \leq z \leq 20$.

17. The membrane-electrode assembly of claim 14, wherein the catalyst particle comprises a metal oxide selected from the group consisting of $MnO_2$, $Co_3O_4$, $NiCo_2O_4$, $Rb_2Ru_2Pb_{1-m}O_{1-n}$, where $0 \leq m \leq 1$, $0 \leq n \leq 0.2$, $Pb_2Ru_2O_{6.5}$, $Na_{0.8}Pt_3O_4$, and $La_{0.6}Ca_{0.4}CoO_3$, and combinations thereof.

18. The membrane-electrode assembly of claim 14, wherein the catalyst is supported on an electro-conductive supporter.

19. The membrane-electrode assembly of claim 18, wherein the electro-conductive supporter is selected from the group consisting of carbon, conductive polymers, and combinations thereof.

20. The membrane-electrode assembly of claim 14, wherein the anion exchange resin layer comprises an amine-based functional group which is covalently bonded to the terminal end of a side chain of a polymer.

21. The membrane-electrode assembly of claim 20, wherein the amine-based functional group is selected from the group consisting of $-NH_2$, $-NR_2$, $-NHR$, $-NR_3^+OH^-$, $-NHR_2^+OH^-$, $-NH_2R^+OH^-$ and $-H_3^+OH^-$ and combinations thereof, where R is independently at least one selected from the group consisting of $C_kH_{2k+1}$, $C_kF_{2k+1}$, and $C_kCl_{2k+1}$, and k is an integer ranging from 1 to 5.

22. The membrane-electrode assembly of claim 20, wherein the polymer is selected from the group consisting of polyolefins, perfluoro-based polymers, polyetheretherketones, polysulfones, polyetherimides, and combinations thereof.

23. The membrane-electrode assembly of claim 14, wherein the cation exchange resin layer comprises a cation exchange resin comprising:
a functional group covalently bonded to the terminal end of a side chain of a polymer, said functional group selected from the group consisting of sulfonic acid groups, carboxylic acid groups, phosphoric acid groups, and combinations thereof.

24. The membrane-electrode assembly of claim 14, wherein the anion exchange resin layer has an average thickness of 0.1 nm to 100 nm.

25. The membrane-electrode assembly of claim 14, wherein the cation exchange resin layer has an average thickness of 0.1 nm to 100 nm.

26. The membrane-electrode assembly of claim 14, wherein the anion exchange resin layer and the cation exchange resin layer are porous.

27. The membrane-electrode assembly of claim 14, wherein the cathode further comprises a conductive agent selected from the group consisting of carbon black, carbon fiber, carbon nanotubes, carbon nanospheres, carbon nanohorns, conductive polymers, and combinations thereof.

28. The membrane-electrode assembly of claim 14, wherein the polymer electrolyte membrane comprises a proton conductive polymer selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, polyphenylquinoxaline-based polymers, and combinations thereof.

29. A fuel cell system comprising:
an electricity generating element comprising:
a membrane-electrode assembly comprising:
a polymer electrolyte membrane, and
an anode adjacent to one side of the polymer electrolyte membrane and a cathode adjacent to the other side of the polymer electrolyte membrane,
the cathode comprising a catalyst composite material comprising:
a catalyst particle characterized by oxygen-reducing activity, the catalyst particle consisting essentially of a material selected from the group consisting of metals, metal oxides, and combinations thereof, and
a resin layer encasing the catalyst particle and comprising an anion exchange resin layer encasing the catalyst particle and a cation exchange resin layer encasing the anion exchange resin layer;
a fuel supplier; and
an oxidant supplier.

30. The fuel cell system of claim 29, wherein the cation exchange resin layer covers at least a portion of the anion exchange resin layer.

31. The fuel cell system of claim 29, wherein the catalyst particle consists essentially of a metal oxide selected from the group consisting of $M_aO_b$, $M_pN_qO_r$, and $M_xN_yP_wO_z$ and combinations thereof, where each of M, N, and P is independently a metal selected from the group consisting of Na, K, Ca, Ag, Cu, Ni, Co, Mo, Ru, Re, Rb, Pb, Pt, and La, $0.1 \leq a \leq 3$, $0.1 \leq b \leq 8$, $0.1 \leq p \leq 3$, $0.1 \leq q \leq 3$, $0.1 \leq r \leq 12$, $0.1 \leq x \leq 3$, $0.1 \leq y \leq 3$, $0.1 \leq w \leq 3$, and $0.1 \leq z \leq 20$.

32. The fuel cell system of claim 29, wherein the catalyst particle consists essentially of a metal selected from the group consisting of Na, K, Ca, Ag, Cu, Ni, Mo, Ru, Re, Rb, Pb, La, Co, Pt, and combinations thereof.

* * * * *

UNITED STATES PATENT AND TRADEMARK OFFICE
CERTIFICATE OF CORRECTION

PATENT NO. : 8,512,915 B2  
APPLICATION NO. : 11/391754  
DATED : August 20, 2013  
INVENTOR(S) : Hee-Tak Kim et al.

Page 1 of 1

It is certified that error appears in the above-identified patent and that said Letters Patent is hereby corrected as shown below:

In the Claims

Col. 11, Claim 21, line 17  Delete "-$NH_2R^+OH^-$ and --$H_3^+OH^-$",  
Insert -- -$NH_2R^+OH^-$, and -$H_3^+OH^-$ --

Signed and Sealed this  
Twenty-fourth Day of February, 2015

Michelle K. Lee  
*Deputy Director of the United States Patent and Trademark Office*